Nov. 10, 1970 R. W. LOVE 3,540,031
CHARACTER CODE TRANSLATOR
Filed Oct. 14, 1965 3 Sheets-Sheet 1

INVENTOR
ROBERT W. LOVE
BY Joseph J Connerton
ATTORNEY

Nov. 10, 1970 R. W. LOVE 3,540,031

CHARACTER CODE TRANSLATOR

Filed Oct. 14, 1965 3 Sheets-Sheet 2

Nov. 10, 1970 R. W. LOVE 3,540,031

CHARACTER CODE TRANSLATOR

Filed Oct. 14, 1965 3 Sheets-Sheet 3

United States Patent Office 3,540,031

Patented Nov. 10, 1970

3,540,031

CHARACTER CODE TRANSLATOR

Robert W. Love, Rhinebeck, N.Y., assignor to International Business Machines Corporation, Armonk, N.Y., a corporation of New York Filed Oct. 14, 1965, Ser. No. 496,016

Int. Cl. H01j *31/10;* H03k *13/247*

U.S. Cl. 340—324 3 Claims

ABSTRACT OF THE DISCLOSURE

A character translator for converting coded information into video signals for display and regeneration storage or to another code includes a planar array of magnetic cores in the form of individual matrices, each character matrix including a plurality of magnetic cores disposed in a configuration corresponding to shape of the specified character. The cores for the specified character are selected by coincident energization of the associated core windings, and are then sequentially reset by a timing pulse distributor to generate video signals which in turn are detected by magnetic core sense windings. To eliminate the noise problem during readout resulting from the random number and polarity of cores in the matrix, a compensating core technique is employed to balance each drive line.

The present invention relates generally to display devices and more particularly to a cathode ray display having an associated character code translator.

One of the limitations associated with digital computer systems is the relatively low speed and high cost of associated input-output (I/O) devices, and considerable effort has been expended to increase the performance and efficiency of such devices and thus augment the capability of the system. One such device finding increased use with computer systems which provides a highly desirable visual concept of I/O applications is a graphic display system frequently having an associated keyboard for assimilating and conveying intelligence to the computer and displaying self-generated or computer-generated messages. As the spectrum of applications for such systems continues to increase, substantial efforts have been expended to lower the cost of the display whereby cost-usage considerations make incorporation of graphic display systems practical.

One of the primary features in cathode ray tube display systems is that of character generation, which may be initiated from an associated keyboard or specified by a host computer. Numerous such systems have been developed, but prior art devices generally tend to be relatively complex and expensive. Since characters are normally specified in binary coded form, it is essential that this code be converted to cathode ray tube deflection and intensity control signals. In addition, where another coded form of a character is required for a non-display function such as signal transmission, for example, some form of automatic code conversion is desirable.

In accordance with the present invention, there is provided a character code translator adapted to convert digital control signals into signals suitable for character generation on a cathode ray tube. A magnetic core matrix comprising a single core plane having cores arrayed in specific character configurations is employed, the core plane including cores arrayed for code conversion and noise compensation. The core matrix converter essentially functions as a magnetic core read-only memory, the code key being a function of the presence or absence of cores in the array. A rectangular planar array corresponding to that utilized in magnetic core planes is employed to permit assembly by existing automatic fabrication techniques, rather than utilizing the intricate, hand-threaded core winding configurations employed in prior art devices. To initiate operation, a six-bit character identification signal is decoded by conventional decoding circuitry to select a specific character, each character comprising a 5 x 7 core array or slot consisting of five volumns of seven rows on the matrix plane. The six-bit signal is divided between two three-bit decoders, each of which provides half-write currents for coincident character selection techniques, switching only those cores in the selected character slot. To read out the data, a full read signal of opposite polarity to the write signal is applied to the five columns containing the selected character in sequence to thereby reset the cores in the specified slot, and signals corresponding to the specified character components are detected through seven associated sense windings to provide five seven-bit word outputs for each character. The resulting output signals identifying the specified character are applied to a buffer storage device where they may be subsequently utilized for character generation and regeneration in a CRT display. The matrix utilizes a compensation core technique to cancel noise during readout.

Accordingly, a primary object of the present invention is to provide an improved code conversion apparatus.

Another object of the present invention is to provide an improved apparatus for converting digital character designating signals into character representing signals for a cathode ray tube display.

Still another object of the present invention is to provide signal conversion apparatus that is low cost and susceptible to mass fabrication techniques.

Another object of the present invention is to provide an improved magnetic core character forming matrix.

Another object of the present invention is to provide a magnetic core character code translator utilizing coincident current selection techniques for character selection.

A further object of the present invention is to provide compensation balancing in a magnetic core encoder to cancel the noise-disturb signals and provide a high signal-noise ratio.

The foregoing and other objects, features and advantages of the invention will be apparent from the following more particular description of a preferred embodiment of the invention, as illustrated in the accompanying drawings.

FIGS. 5(*a*) and (*b*) illustrate a 5 x 7 core array for an exemplified character and its resultant display on the screen of a cathode ray tube.

Figure 1:
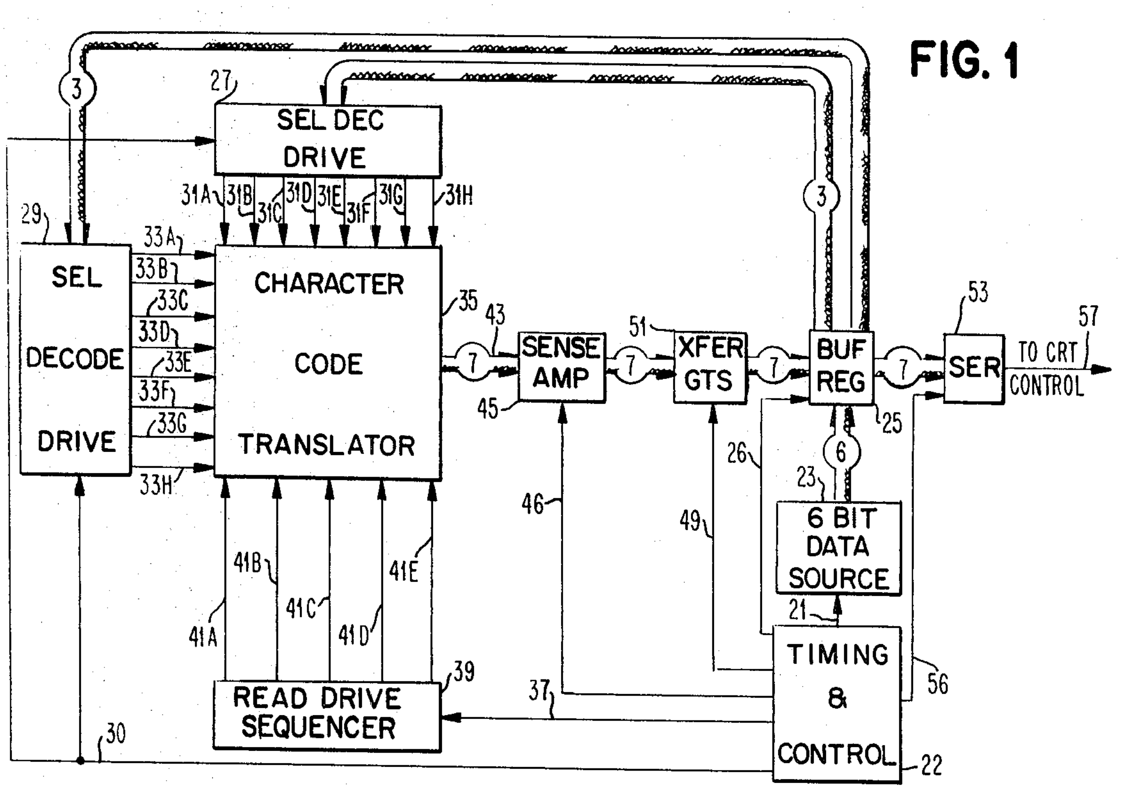
FIG. 1 illustrates in block schematic form the basic organization of a character generation system in accordance with the present invention.

Referring now to the drawings and more particularly to FIG. 1 thereof, in response to a control signal on line 21 from timing and control circuit 22, data in the form of a six-bit byte of digitally coded information is transferred from a data source 23 to a buffer register 25. The data signal might be keyboard generated, for example, or supplied by an associated digital computer. The six-bit signal in buffer register 25 is transferred under control of control line 26 as two three-bit signals, the three high and low order bits, to vertical and horizontal selection decoder drivers 27 and 29 respectively. Since each three-bit binary word affords eight discrete selections, a total of 8 x 8 or 64 character identification capability is provided by the present invention. Decoder drivers 27 and 29 are conventional binary decoders which selectively energize one of the eight vertical inputs 31A–31H and one of the eight horizontal inputs 33A–33H to character code translator 35, and provide drive signals of half select magnitude to the selected drive line.

The character code translator 35 essentially comprises a matrix of characters, each character being defined within a 5 (column) x 7 (row) slot of cores. Each output 31A–31H of selection decoder driver 27 is wound through five consecutive columns and each output 33A–33H of decoder 29 is wound through seven consecutive rows. Coincident selection techniques are employed for character selection whereby one of 64 character matrices or cells in a character code translator 35 is selected in response to half write signals in the selected row and column. Magnetic core coincident selection technique is that technique whereby the cumulative signal resulting from half select signals is sufficient to establish or reverse the remanent state of a magnetic core. Assuming that all cores in the character code translator 35 are initially reset, i.e., all cores in the binary 0 state, coincident selection of a character in the above described manner causes those cores within the selected 5 x 7 matrix and only those cores to be switched to the binary "1" state. Further, as more fully described hereinafter, those cores are mounted in a configuration corresponding to the configuration of the character they define since they are designated for operation in a time dependent scan system. In response to a control signal on line 37, read-drive sequencer 39 is actuated to apply full read signals to read windings 41A–41E in sequence, each of the five read windings being threaded through a corresponding column throughout the core plane. For example, read line 41A is threaded through columns 1, 6, 11, etc., line 41B through columns 2, 7, 12 and so forth. In accordance with conventional practice, the read signal is of the opposite polarity as the write or select signals and causes those cores in the specified row which have been selected to be reset to the binary 0 state by reversing their magnetic remanent state. A group of seven sense windings link all character cells by row, and are shown connected by cable 43 to sense amplifiers 45.

Figure 5A:
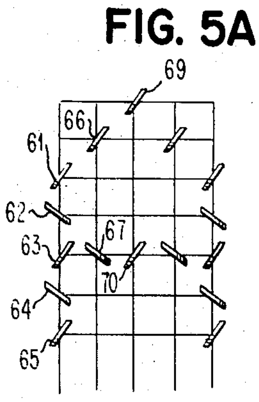
Figure 5B:
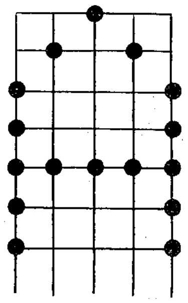

When a full read signal is applied from read-driver sequencer 39 to lines 41A–41E, the cores in the row of the selected character, if any, will be reset and the resultant signals detected by the sense windings and applied to sense amplifiers 45 such that after a complete cycle from sequencer 39, a pattern of five seven-bit words indicative of the selected character will be generated. Read-drive sequencer 39 may constitute any one of a series of well known prior art devices such as a flip-flop counter and decoding matrix where the drive is advanced to the following stage each time the distributor receives an advance count or any of a wide variety of shift registers. The resulting signals from sense amplifiers 45 are gated through transfer gate circuits 51, conditioned by control line 49, in parallel on a column by column basis through buffer register 25 to serializer 53. Serializer 53, in combination with a control line 56, effects a parallel to serial conversion of the five seven-bit signals indicative of the character in conventional manner. The serialized signals are then transferred via line 57 labeled "To CRT Control" to a storage device such as, for example, a circulating delay line buffer, to effect display and regeneration of selected characters on a cathode ray tube. Alternatively, the signals on line 57 could be applied directly to effect CRT control. The serialized signals on line 57 are used to unblank the CRT beam, each output causing the beam to be unblanked, such unblanking signals producing corresponding dots on the associated cathode ray tube display such as shown in FIG. 5(b). The characters generated on the CRT screen are in the form of a 5 x 7 dot matrix, each dot in the display having a corresponding core in its associated character cell. For example, the character cell for the character A is shown in FIG. 2(a), while the corresponding character generated on the screen of the CRT is the dot matrix shown in FIG. 2(b).

Summarizing the general mode of operation shown in FIG. 1, a six-bit BCD word identifying the selected character is placed in the Buffer Register 25 and transferred as two three-bit bytes to selection decoder drivers 27 and 29 where they are decoded to drive one output with signals equal to half write magnitude to set all cores in the selected character slot. The Buffer Register is then cleared, and the Read Drive Sequencer cycled through its five outputs 41A–41E resetting the cores in lines 41A–41E in sequence. The seven sense amplifiers threaded through the character code translator 35 are strobed after each read drive signal, and the seven-bit word transferred through the Buffer Register 25 to serializer 53, where it is converted to appropriate intensity control signals for a display cathode ray tube. The Buffer Register 25 is reset after each transfer to serializer 53.

Figure 2:
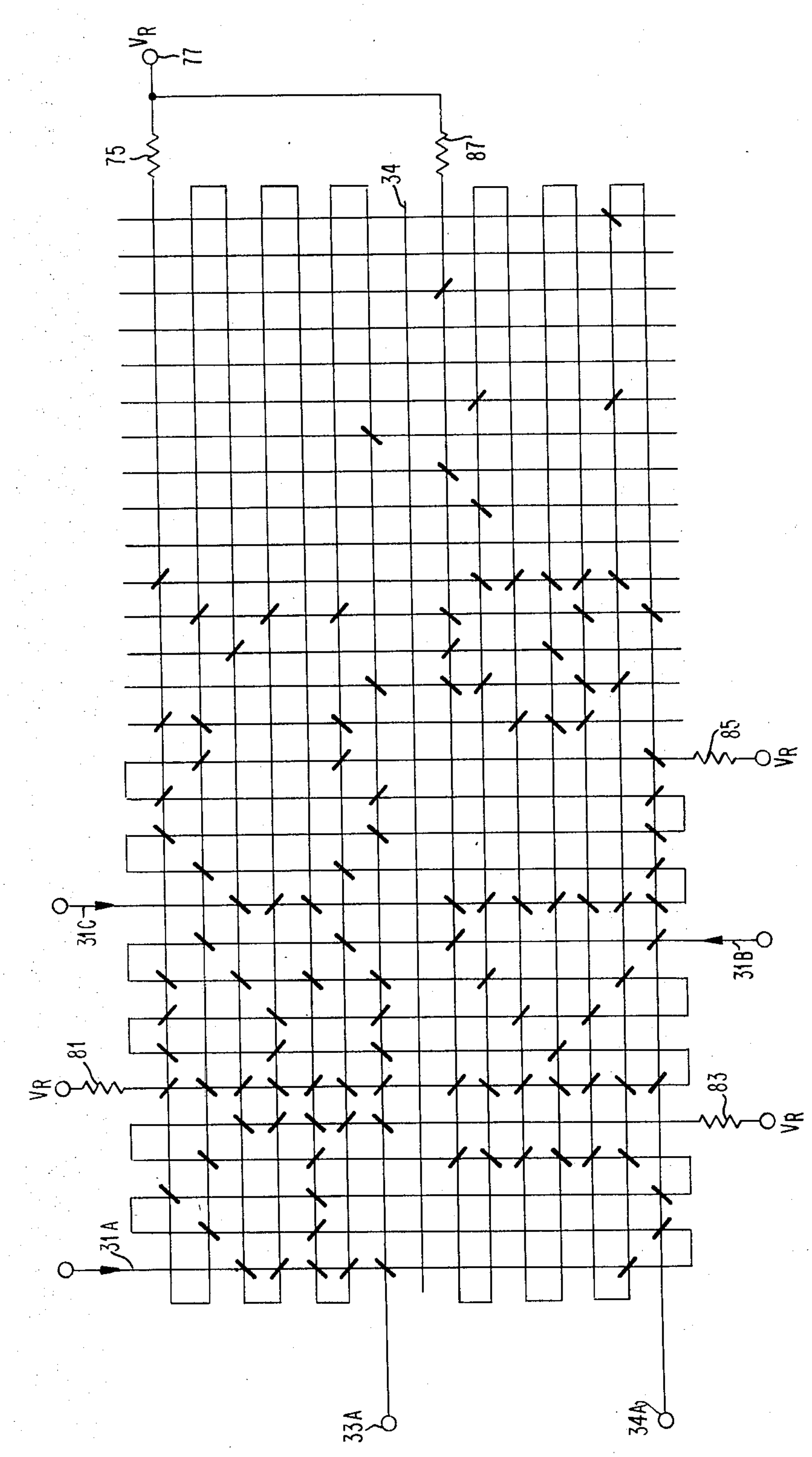
FIGS. 2 and 3 illustrate wiring diagrams of the write-selection and read-sense configurations of the character code translator.
Figure 3:
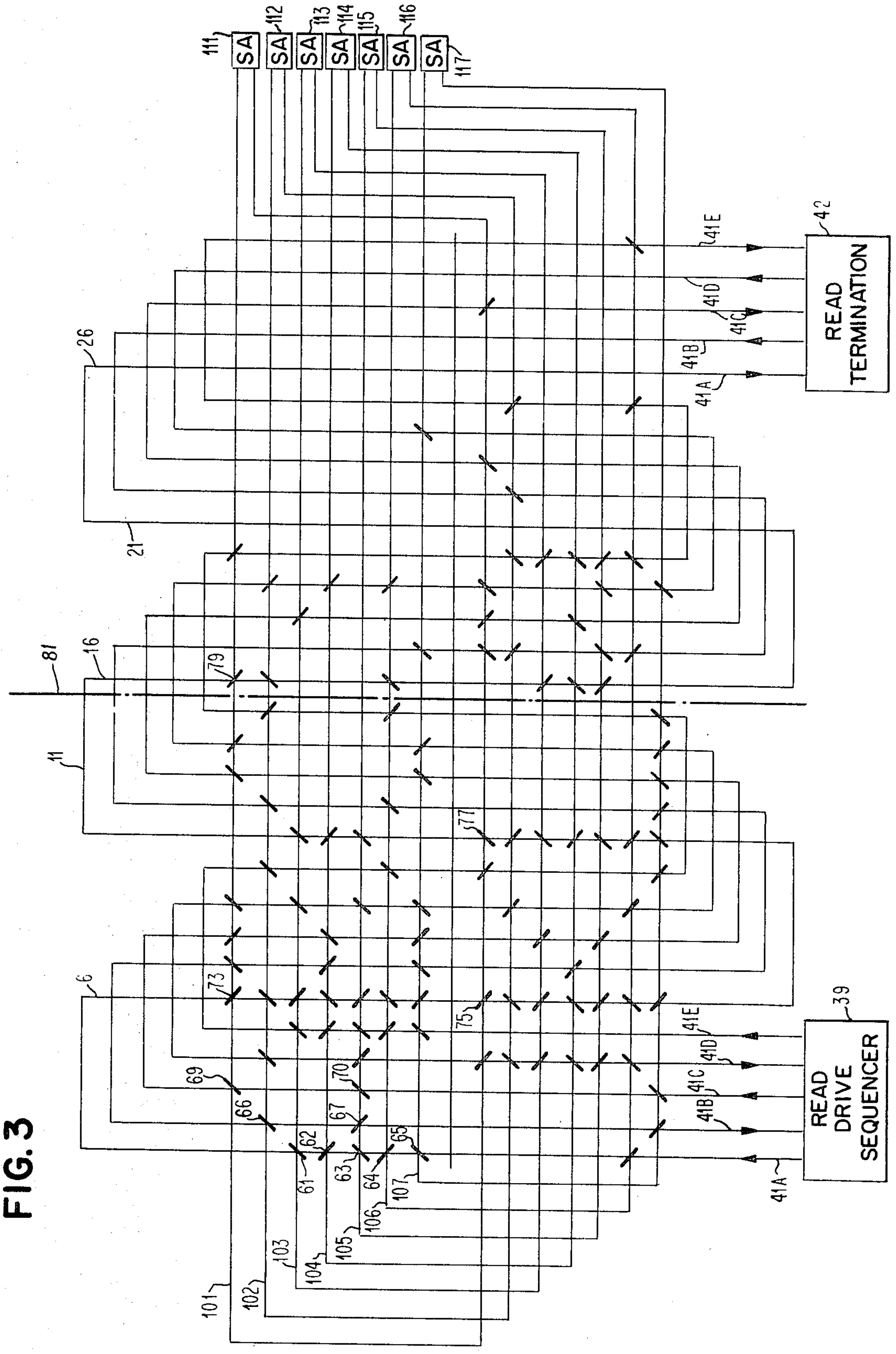

To avoid undue complexity in the ensuing description, the wiring of the character code translator matrix is shown in two separate drawings, FIG. 2 representing the write-select wiring, FIG. 3 representing the read-sense wiring. However, it will be appreciated that FIGS. 2 and 3 illustrate the same core plane having a character designating portion and a compensation portion, the character designating portion having a total of four wires threaded therethrough, two wires for coincident selection or writing, a read winding and a sense winding, the compensation portion of the plane having three windings therethrough, a single selection winding and read and sense windings. Also, for ease of description, a six character matrix and its associated compensation matrix will be illustrated and described, although it will be appreciated that a total of 64 characters may be employed in the subject invention. The six characters selected for display are arranged in two rows of three characters each, characters A, B, C on the first row, J, K, L on the second.

Referring now to FIG. 2, there is illustrated the write-select winding configuration of the character code translator. Assuming that the character has been selected and decoded and that the selected character is A, the character defined in the upper left section of FIG. 2, a half-write amplitude signal is applied from decoder-driver 27 (FIG. 1) to line 31A which is threaded through all cores in rows 1–5 in the manner illustrated, terminating through resistor 83 at a source of reference voltage $V_R$. Line 31B is connected to the next adjacent group of five rows, being terminated through resistor 81 at the reference voltage source $V_R$. In accordance with conventional magnetic core memory technology, the current through adjacent rows is always in opposite directions, and is so illustrated in FIG. 2. Line 31C is connected to the third group of five rows in the matrix, and terminated through resistor 85 to the reference voltage $V_R$. It will be appreciated that in practice a single source of reference volage would be provided. Thus the first fifteen columns in the matrix define the character designating portion of the illustrated simplified embodiment, while the last group of fifteen columns in the matrix contain the compensation cores.

Since each characted is defined within the core matrix by a 5 x 7 group of slots of cores, the second half-write select signal is applied from select decoder driver 29 (FIG. 1) to line 33A, which is threaded through the first seven horizontal rows of the core matrix in the manner illustrated in the drawing, and is terminated through a resistor 75 to a source of reference voltage 77. The second output from select decoder driver 29, line 33B, is connected to the next group of seven horizontal lines and is terminated through resistor 87 at the reference voltage 77. As shown in the drawing, a blank line 34 is interposed between rows 7 and 9 to provide vertical character spacing and to permit the selection decoder drive lines 33A–33H to drive from the same side. This selection of an individual character within the matrix is effected by coincident energizing of the vertical and horizontal lines which encompass the selected character.

For example, to select the character A, a one-half write-select signal is applied from driver select decoder 27 to line 31A, while the second half select-write signal is applied from select decoder driver 29 to conductor 33A. The resulting coincidence of the two half select signals causes the cores representative of the selected character as defined within the selected 5 x 7 matrix to be set to their binary "1" remanent state. For uniformity of description, cores are described as being "set" to the binary "1" state or reset to the binary "0" state. It will be appreciated that in practice drive lines 31A–31H are each threaded through five columns of eight characters, while lines 33A–33H are threaded through seven rows of eight characters. The coincident selection techniques employed provides a substantial savings in cost by permitting the use of eight bit decoders as compared to the 64 bit decoders which would be required utilizing conventional full-write selection techniques. In the preferred embodiment, the character code for the array was specified for reasons unrelated to the present invention. Accordingly, each character is positioned in the location designated by directly decoding the character identification signal, thus obviating the necessity for another level of code conversion required for any other format.

Referring now to FIG. 3, there is illustrated the read-sense winding configuration of the character code translator matrix illustrated and described relative to FIG. 2. As shown in FIG. 1 and described relative thereto, readout is accomplished by application of full read currents from read drive sequencer 39 to conductors 41A–41E in sequence, each of which is threaded through the corresponding column throughout the matrix. For example, a full read pulse applied to conductor 41A is likewise applied to columns 6, 11, 16, 21 and 26, comprising column 1 of the second and third groups of characters, and three columns of the compensation cores, subsequently described, terminating in read termination block 42. With respect to the compensation core matrix comprising the 15 columns to the right of line 81, only one half select signal can be applied thereto since the drive lines from the vertical select decoder driver 27 are not wound therethrough. Thus the compensation cores remain reset and are not switched by the full read current.

Sense windings 101 through 107 are threaded through rows 1–7 of the entire character code translator and connected in conventional differential manner to associated sense amplifiers 111–117. While shown as a single block in FIG. 1, individual differential sense amplifiers are employed for each of the seven sense windings. The sense amplifiers 111–117, connected as shown, will detect any reversal of polarity of cores during the readout operation. Thus, as a full read signal is applied to all windings throughout the code translator in sequence, the resultant core switching, if any, would be detected by sense lines 101–107.

As previously described, the output from sense amplifiers 111–117 will be gated through transfer gate 51 to a serializer 53, causing each 7 bit word of the character identifying signals to be stored in a serial buffer storage device in proper sequence to actuate a CRT display. Readout will be described relative to FIGS. 3 and 5(*a*). Considering readout of the character A which was previously selected, as the full read current is applied to line 41A, cores 61 through 65, in row 1, will be reset and signals indicative of the reversal of remanent states will be detected by sense lines 103 through 107 respectively. Thus, the first seven bit signals read from the sense amplifier to the buffer is 0011111. After transfer to the serializer and clearing of the buffer, the next read signal is applied to line 41B, cores 66 and 67 are switched, and the resulting reversal of polarity detected by sense lines 102 and 105. A read signal applied to line 41C switches cores 69 and 70, producing an output in sense lines 101 and 105. Due to the physical configuration of the letter A in the 5 x 7 matrix, lines 41D and 41E produce signal pattern identical to lines 41B and 41A respectively. The five 7 bit parallel word output representing the letter A is as follows:

| | Line |
|---|---|
| 0011111 | 41A |
| 0100100 | 41B |
| 1000100 | 41C |
| 0100100 | 41D |
| 0011111 | 41E |

One of the problems associated with magnetic core readout in the present invention arises from the fact that cores are utilized only in those locations necessary to define the character rather than the full core plane employed in magnetic core memories. During the character readout process, a number of cores not associated with the selected character are subjected to full read signals and produce read selected zero noise of opposing polarities on the sense windings. These noise signals are cumulative such that the resulting noise, depending on its polarity, may be read out as an erroneous signal indication or inhibit true signal readout. During readout, a read winding may produce read selected zero "delta noise" of either polarity on each of seven sense windings in those locations where cores exist. The orientation of each core with respect to the read and sense windings determines whether the noise is positive or negative. In conventional magnetic memory planes, this problem is obviated since adjacent lines are always wound in opposite directions and each core is oriented in substantially a perpendicular direction with respect to each adjacent core. Thus, in the normal magnetic core plane, the positive and negative delta noise effectively cancel. This normal balance is eliminated in the present invention due to the random positioning of cores in only specified character indicating locations in each 5 x 7 character slot. To eliminate this condition, and still maintain a high signal to noise ratio, a compensating technique is employed such that the noise resulting from any unselected cores on any sense winding with respect to a particular drive line is compensated by a corresponding number of cores of the opposite polarity on the unselected portion of the drive. For example, considering sense winding 101 with respect to read line 41A within the six character section of the character code translator shown in FIGURE 3, it will be seen that magnetic core 73 is positioned at one of the intersections of sense line 101 and read line 41A. Magnetic cores 75 and 77 are positioned at the lower intersections of drive line 41A and sense line 101. The direction of current and the relative positioning of cores 75 and 77 in the array produce signals opposite to those produced by core 73 such that the net effect on sense line 101 is a noise voltage of one core magnitude produced by the lower cores. This is effectively balanced by positioning compensating core 79 at the first intersection of drive read line 41A and sense line 101 in such a position within the compensation portion of the character code translator that it cancels or compensates for the excess core, 75, 77 so that the net effect insofar as the load is concerned with respect to sense line 101 is zero.

As is well known in the art, the polarity or direction of the noise signal provided by driving unselected cores will depend on the relative orientation of the cores in the array and the direction of the read current therethrough. By balancing in this manner, since each of the sense lines after being threaded through the configurations terminates in a differential sense amplifier, the net noise effect produced in the sense output driving through the unselected cores in the matrix is effectively canceled. Upon balancing of sense line 101 with respect to drive line 41A, the remaining sense lines 102–107 must be similarly individually balanced with respect to read line 41A. To complete the compensation for the six character array illustrated in FIGS. 2 and 3, the above described process must be repeated for each of the remaining four read lines 41B–41D with respect to the seven sense lines 101–107. Thus, within the simplified six character matrix illustrated in FIG. 2 and 3, a total of 35 separate balancing operations must be performed in the manner described before complete compensation is obtained. While it will be appreciated in more complex character matrices, such as the 64 character matrix previously referred to, the balancing or compensation would represent a more complex problem than that presented by the six character matrices in FIGS. 2 and 3, the same technique described above is employed.

Summarizing the operation of the character code translator, signals indicative of the selected character are applied from a data source to select decoder drivers shown as blocks 27 and 29 in FIG. 1. When decoded,, half-write amplitude signals will be generated by the respective decoder drivers and applied to the selected 7 x 5 character slot within the character translator to cause all cores within the slot to be switched from the zero to the one state. For example, as shown in FIG. 2, a half-write signal applied to conductors 31A and 33A will cause those cores in the 7 x 5 matrix designating the character A to be switched to the one state. Reference is made to FIG. 5A which illustrates in enlarged form the specific core configuration for the character A. In like manner, the other characters B, C, J, K, L have specific code combinations which, when decoded, would be similarly selected and driven by the selection decoder drivers 27 and 29.

Referring back to FIG. 3 and summarizing, read line 41A is threaded through each row 1 associated with the character matrix as well as row 1 associated with the compensating core portion of the character code translator 35. As the read drive sequencer steps from line 41A through line 41E, a full read signal of opposite polarity is applied to successive lines, the resulting reversal of state of the set cores being detected by sense amplifiers 111–117. The information within the sense amplifiers is read out in conventional fashion after each full read signal in the manner described generally with respect to FIG. 1. Upon completion of the five drive signals applied by read driver sequencer 39, the information detected by reversing those cores within the selected matrix is serialized in the manner described with reference to FIG. 1 and applied either directly to control the intensity of a cathode ray tube or alternatively may be applied to a buffer such as a delay line for subsequent display and regeneration. By utilizing coincident selection in the manner described with reference to FIG. 2, substantial saving in decoding and drive circuitry are afforded, while the compensation technique described eliminates the attendant problems normally encountered in driving selected cores.

Figure 4:
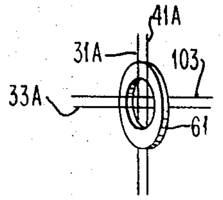
FIG. 4 illustrates the winding of a typical core in the configuration.

Referring now to FIG. 4, there is illustrated a composite view of one of the cores to illustrate the complete wiring pattern. Considering core 61, also shown in FIGS. 2 and 3, lines 31A and 33A designate the half-select lines from the select decoder drivers 27 and 29. Line 41A represents the full read signal line applied from the read drive sequencer 39, while line 103 represents the sense line associated with the specified core. Each of the cores throughout the character matrix will be wired in like manner with four conductors therethrough. The compensating core matrix is wired with three conductors therethrough, only the half-select line from the selection decoder drive 29 being connected, since it is not desired at any time to provide a full select signal to the compensating cores.

Referring briefly to FIG. 5(a), a 5 x 7 matrix representing the character A shown in FIGS. 2 and 3 and the corresponding dot configuration displayed on the face of the CRT are shown in FIGS. 5(a) and 5(b) respectively. With the cores in a specific character configuration, by synchronizing the vertical scan of the cathode ray tube with the readout pulses from the serializer and the horizontal scan with the read drive sequencer (39), the apparatus is made to generate a dot pattern on a cathode ray tube that is related directly to the geometrical disposition of the cores if the pulses received from the serializer are used to blank and unblank the beam of the cathode ray tube. Once those signals designating the selected character have been read out from the character code translator, the techniques used to control the horizontal and vertical scan as well as to blank and unblank the beam are well known in the art and not considered necessary for an understanding of the present invention.

In addition to generating a video signal output as heretofore described, the present invention may be employed for various code to code conversions. This is accomplished by using a separate group of cores for the various codes associated with each character matrix. As illustrative of this technique, a column of seven cores with associated selection and read driving means would be utilized for each individual code conversion. For example, where it is desired to convert the BCD code into ASC II (American Standard Code) for transmission over telephone lines, a column of seven cores, for example, the sixth row, would have cores positioned in those locations where the ASC II code designated a one, and no cores in the zero position, as in the character code conversion. The cores in the codes associated with the character would be selected by the character coincident selection, while a separate read driver or another output from the read drive sequencer would be used to generate the new code using the heretofore described sensing techniques. In an embodiment constructed in accordance with the present invention, four different code conversions were provided such that each character configuration utilized a 9 x 7 core matrix.

While the character generator contemplated for use with the character code translator utilized a television type of time dependent scan, the character code translator of the instant invention can be utilized with any scanning technique, the only requirement being that the speed of the character code translator be compatible with that of the associated scanning technique. Thus the present invention provides a relatively rugged code translator utilizing nominally priced magnetic cores but only in those locations where needed and still adaptable to automated production techniques.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data display system for generating a pattern for display on a cathode ray tube in response to coded signals representative of predetermined symbols, the combination comprising storage means comprising a planar array of magnetic cores, said planar array comprising a plurality of individual magnetic core matrices, each of said matrices corresponding to one of said predetermined symbols, said magnetic cores in each of said matrices being geometrically positioned to correspond to the configuration of said predetermined symbols represented thereby, decoding means for decoding said coded signals, means responsive to said decoding means for applying coincident signals to selected symbol matrix and setting the magnetic cores therein in a first state, readout means for reversing in a predetermined sequence the state of said magnetic cores in said selected symbol matrix, sensing means for detecting said reversal of state of said magnetic cores in said selected matrix and generating signals indicative of said reversal of state, means responsive to said generated signals for controlling the intensity of a cathode ray tube operated in a synchronous scanning mode for reproducing said selected symbol on said cathode ray tube, and means to compensate for noise from unselected cores resulting from said geometric positioning of said magnetic cores in each of said matrices to provide a balanced readout condition.

2. Apparatus of the type claimed in claim 1 wherein said noise compensating means includes a plurality of magnetic cores on each sense line so arranged that the cumulative noise resulting from unselected cores on each of said sense lines is balanced by a corresponding number of cores of the opposite polarity with respect to each drive line.

3. Apparatus of the type claimed in claim 2 further comprising a differential amplifier associated with each sense line whereby the net noise effect produced by driving through the unselected cores in the matrix and said noise compensating cores is effectively cancelled.

References Cited

UNITED STATES PATENTS

| | | | |
|---|---|---|---|
| 2,843,838 | 7/1958 | Abbott | 340—347 X |

| | | | |
|---|---|---|---|
| 2,931,022 | 3/1960 | Triest | 340—324 |
| 2,964,737 | 12/1960 | Christopherson | 340—347 X |
| 2,973,506 | 2/1961 | Newby | 340—347 X |
| 3,078,447 | 2/1963 | Ketchledge | 340—166 X |
| 3,110,015 | 11/1963 | Minnick | 340—166 X |
| 3,123,816 | 3/1964 | Schramel et al. | 340—347 |
| 3,175,208 | 3/1965 | Simmons | 340—166 X |
| 3,201,768 | 8/1965 | Merz | 340—166 X |
| 2,920,312 | 1/1960 | Gordon et al. | 340—324.1 |
| 3,012,839 | 12/1961 | Epstein et al. | 340—324.1 |
| 3,098,222 | 7/1963 | Freedman | 340—347 |
| 3,109,166 | 10/1963 | Kronenberg et al. | 340—324.1 |
| 3,115,619 | 12/1963 | Barrett et al. | 340—174 |
| 3,123,816 | 3/1964 | Schramel et al. | 340—347 |
| 3,181,136 | 4/1965 | Lambourn | 340—347 |
| 3,308,448 | 3/1967 | Shahbender | 340—174 |

MAYNARD R. WILBUR, Primary Examiner
GARY R. EDWARDS, Assistant Examiner

U.S. Cl. X.R.

340—166, 347